United States Patent
Murase et al.

(10) Patent No.: US 7,716,919 B2
(45) Date of Patent: May 18, 2010

(54) CONTROL DEVICE AND CONTROL METHOD FOR INTERNAL COMBUSTION ENGINE

(75) Inventors: Nao Murase, Susono (JP); Hiroki Ichinose, Fujinomiya (JP); Yuuichi Katou, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 376 days.

(21) Appl. No.: 11/582,963

(22) Filed: Oct. 19, 2006

(65) Prior Publication Data

US 2007/0084197 A1 Apr. 19, 2007

(30) Foreign Application Priority Data

Oct. 19, 2005 (JP) ............................. 2005-304952

(51) Int. Cl.
*F01N 3/00* (2006.01)
(52) U.S. Cl. .............................. 60/289; 60/274; 60/285
(58) Field of Classification Search .................. 60/285, 60/287, 289, 284, 293, 290, 278, 274
See application file for complete search history.

(56) References Cited

U.S. PATENT DOCUMENTS

| | | | | |
|---|---|---|---|---|
| 4,479,186 A | * | 10/1984 | Takao et al. .................. 701/104 |
| 5,293,741 A | * | 3/1994 | Kashiyama et al. ............ 60/284 |
| 5,832,725 A | * | 11/1998 | Sim .............................. 60/289 |
| 5,992,143 A | * | 11/1999 | Manaka et al. ................. 60/284 |
| 6,266,957 B1 | * | 7/2001 | Nozawa et al. ................. 60/284 |
| 6,574,961 B2 | * | 6/2003 | Shiraishi et al. ............... 60/602 |
| 6,668,546 B2 | * | 12/2003 | Hayman et al. ................ 60/284 |
| 6,691,506 B2 | * | 2/2004 | Shimizu ........................ 60/284 |
| 6,772,720 B2 | * | 8/2004 | Majima ................... 123/90.15 |
| 6,935,312 B2 | * | 8/2005 | Murase et al. .......... 123/406.54 |
| 7,063,056 B2 | * | 6/2006 | Nakai et al. .............. 123/90.15 |
| 7,152,574 B2 | * | 12/2006 | Mashiki et al. .............. 123/299 |
| 7,155,899 B2 | * | 1/2007 | Beer et al. ..................... 60/284 |
| 7,222,602 B2 | * | 5/2007 | Fukasawa .................... 123/299 |
| 2003/0070423 A1 | * | 4/2003 | Morinaga et al. .............. 60/284 |

FOREIGN PATENT DOCUMENTS

| | | |
|---|---|---|
| JP | 04-347319 A | 12/1992 |
| JP | 2001-050040 A | 2/2001 |
| JP | 2001-263050 | 9/2001 |
| JP | 2001263050 A * | 9/2001 |
| JP | 2002-155767 A | 5/2002 |
| JP | 2002-227630 A | 8/2002 |
| JP | 2003-120348 A | 4/2003 |
| JP | 2004-124824 | 4/2004 |

(Continued)

*Primary Examiner*—Thomas E Denion
*Assistant Examiner*—Diem Tran
(74) *Attorney, Agent, or Firm*—Kenyon & Kenyon LLP

(57) ABSTRACT

When starting an internal combustion engine from cold, after-burning of unburned HC in the exhaust gas within an exhaust passage is promoted by supplying secondary air into the exhaust passage upstream of a catalyst. At this time, the pressure within the exhaust passage is controlled by controlling the opening timing of an exhaust valve. Desirably, when the exhaust temperature has been elevated to a temperature at which it is possible to promote after-burning of the unburned HC in the exhaust gas within the exhaust passage, the opening timing of the exhaust valve is retarded.

9 Claims, 13 Drawing Sheets

FOREIGN PATENT DOCUMENTS

| | | |
|---|---|---|
| JP | 2004-144101 A | 5/2004 |
| JP | 2004-251224 A | 9/2004 |
| JP | 2004-332558 A | 11/2004 |
| JP | 2005-036673 A | 2/2005 |
| JP | 2005-061279 A | 3/2005 |
| JP | 2005-090396 A | 4/2005 |
| WO | PCT/IB2006/002104 | 8/2006 |

* cited by examiner

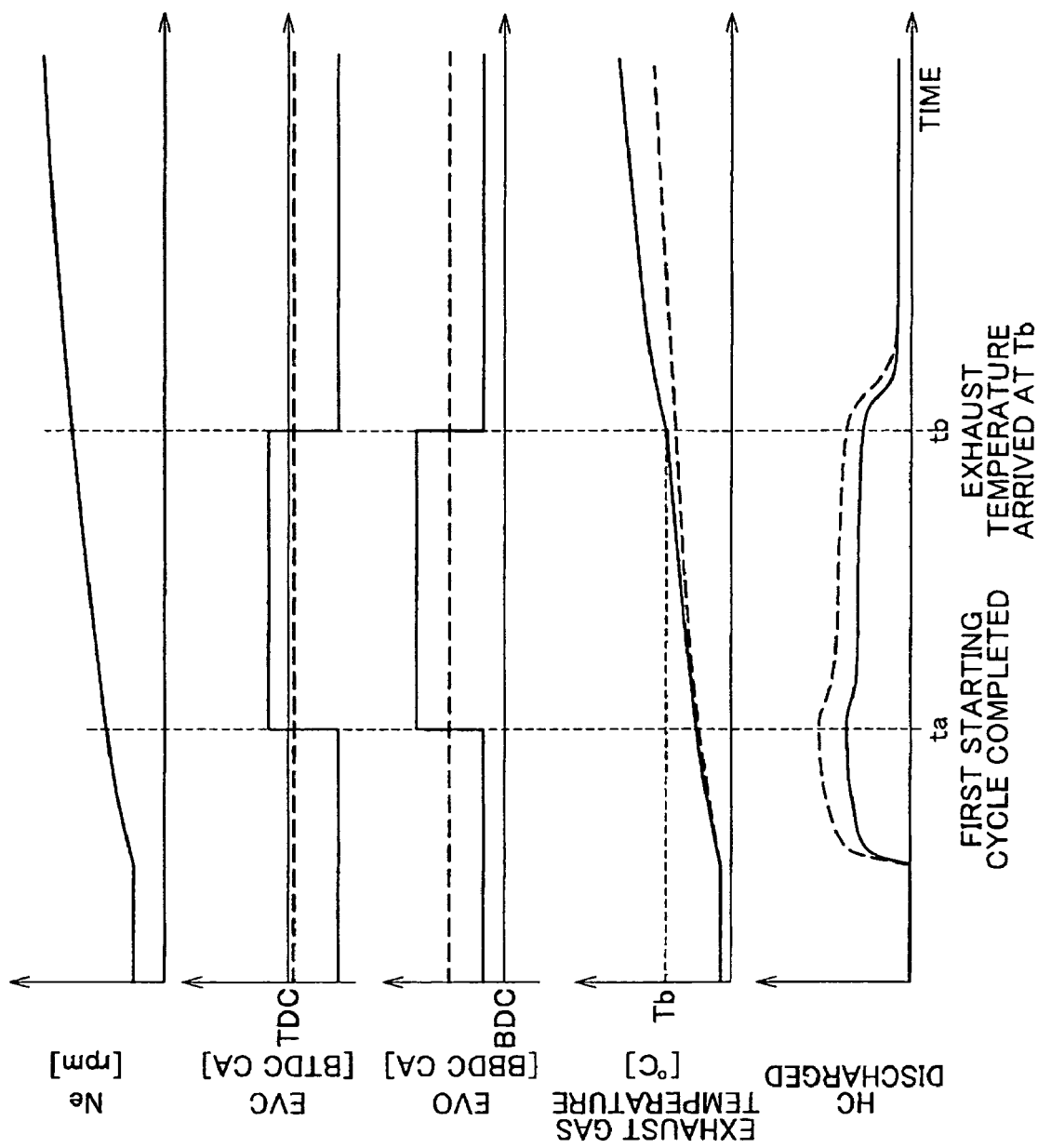

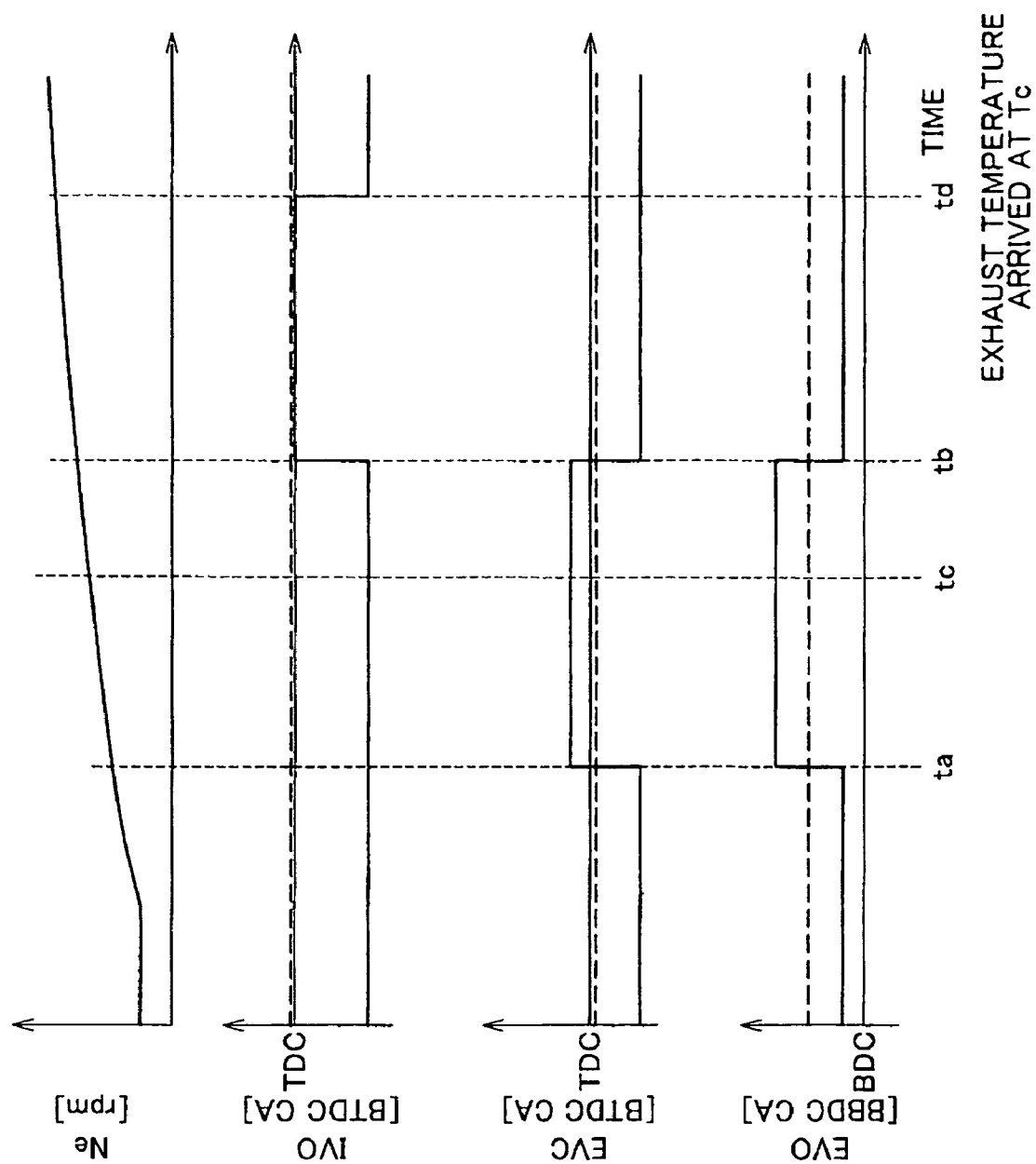

CONTROL DEVICE AND CONTROL METHOD FOR INTERNAL COMBUSTION ENGINE

The disclosure of Japanese Patent Application No. 2005-304952 filed on Oct. 19, 2005 including the specification, drawings and abstract is incorporated herein by reference in its entirety.

BACKGROUND OF THE INVENTION

1. Field of the Invention

The present invention relates to a control device and a control method for an internal combustion engine, and more particularly relates to a control device and a control method for an internal combustion engine, which cause after-burning of unburned HC in the exhaust gases within the exhaust passage by supplying secondary air upstream of a catalyst in the exhaust passage.

2. Description of the Related Art

As described in, for example, Japanese Patent Application Publication No. JP-A-2001-263050, there is a per se known technique of, when starting an internal combustion engine, supplying external air taken in by an air pump as secondary air into the exhaust passage upstream of a catalyst, and thereby causing unburned HC (rich components) in the exhaust gas to be after-burned within the exhaust passage. With the technique described in this Japanese Patent Application Publication No. JP-A-2001-263050, the combustion in the internal combustion engine is positively controlled according to the ignition timing or the like, so that the exhaust temperature reaches at a level at which after-burning can take place: and secondary air is supplied into the exhaust passage.

The amount of secondary air which is supplied is determined by the rotational speed of the air pump and the pressure within the exhaust passage, and, if the rotational speed of the air pump is constant, the amount of secondary air which is supplied becomes less, the higher is the pressure within the exhaust passage. However, with the above described technique, no consideration is given to the pressure within the exhaust passage when supplying the secondary air. Due to this, with the above described technique, sometimes a situation arises in which, because the pressure within the exhaust passage is high, it is not possible to supply a sufficient amount of secondary air. In this type of situation, it is not possible to cause sufficient after-burning of the unburned HC within the exhaust passage, and there is a possibility that this unburned HC will be discharged into the atmosphere just as it is, which is undesirable. Furthermore, since sufficient after-burning to raise the exhaust temperature is not done, sometimes it takes an unduly long time for the catalyst to become warmed up. In other words, with the above described technique, the possibility of reliably obtaining the beneficial effects of after-burning by supply of secondary air has not been fully realized, and there is as yet room for improvement in enhancement of the exhaust emissions when starting the internal combustion engine, in particular during starting of the engine from cold.

SUMMARY OF THE INVENTION

The object of the present invention is to provide a control device and a control method for an internal combustion engine, which can enhance the quality of the exhaust emissions during engine starting, and particularly during cold engine starting.

A first aspect of the present invention is a control device for an internal combustion engine in which unburned HC in the exhaust gas is after-burned in the exhaust passage by supplying secondary air to upstream of a catalyst in an exhaust passage, including a valve timing control device which controls the valve timing of an exhaust valve, and which, during supply of the secondary air, controls the pressure within the exhaust passage, by controlling the opening timing of the exhaust valve with the exhaust valve timing control device.

According to this first aspect of the present invention, by controlling the opening timing of the valve and thus controlling the pressure within the exhaust passage, it is possible to flow the secondary air into the exhaust passage in a simple and easy manner, and conversely it is also possible to prevent the secondary air from entering to within the exhaust passage. In concrete terms, if the opening timing of the exhaust valve is set to the retarded side, then it is possible to lower the gas pressure of the exhaust gas which is discharged from the combustion chamber when the exhaust valve is opened, and it is possible thus to lower the pressure within the exhaust passage. According to this, in a state in which it is desired to promote the after-burning of unburned HC within the exhaust passage, it becomes possible to flow the secondary air to within the exhaust passage in a simple and easy manner. On the other hand, if the opening timing of the exhaust valve is set to the advance side, then it is possible to increase the gas pressure of the exhaust gas which is discharged from the combustion chamber when the exhaust valve is opened, so that it is possible to elevate the pressure within the exhaust passage. According to this, for example in a state in which the exhaust temperature is not sufficiently elevated, it is possible to prevent the flowing in of secondary air into the exhaust passage at a low temperature.

In a second aspect of the present invention, in the first aspect, there is further included a device which measures or estimates exhaust temperature, and, if the exhaust temperature has become elevated to a temperature at which it is possible for after-burning of unburned HC in the exhaust gas to take place in the exhaust passage, the exhaust valve timing control device sets the opening timing of the exhaust valve more to the retarded side, than its opening timing which is set before the exhaust temperature attained the temperature at which it is possible for after-burning to take place.

According to this second aspect of the present invention, by retarding the opening timing of the exhaust valve when the exhaust temperature has become elevated to the temperature at which it is possible for after-burning to take place, it is possible to promote the after-burning of the unburned HC by conducting a larger amount of secondary air into the exhaust passage. Due to this, it is possible also to promote the warming up of the catalyst while performing combustion processing of the unburned HC, so that it is possible to improve the exhaust emissions during starting of the internal combustion engine, and in particular during starting up from cold.

In a third aspect of the present invention, in the second aspect, there is further included an intake valve timing control device which controls the valve timing of an intake valve, and the intake valve timing control device sets the opening timing of the intake valve more to the retarded side before the exhaust temperature attains the temperature at which after-burning can take place, than its opening timing which is set after the exhaust temperature attains the temperature at which after-burning can take place.

According to this third aspect of the present invention, by retarding the opening timing of the intake valve and thereby enhancing the intake flow speed into the combustion chamber, it is possible to create turbulence in the flow of the mixture gas within the combustion chamber, so that it is possible to anticipate an enhancement of the combustion. By doing this, even in the state in which the temperature of the exhaust has not attained a temperature at which after-burning can take place, so that combustion processing of the unburned HC cannot adequately be performed by after-burning, it is still possible to reduce the amount of unburned HC which is discharged, and accordingly it is possible to improve the quality of the exhaust emissions.

In a fourth aspect of the present invention, in the second or the third aspect, there is further included an intake valve timing control device which controls the valve timing of an intake valve, and the intake valve timing control device sets the opening timing of the intake valve to the neighborhood of top dead center for a predetermined period after the exhaust temperature has attained the temperature at which it is possible for after-burning to occur.

According to this fourth aspect of the present invention, by setting the opening timing of the intake valve to the neighborhood of top dead center, it is possible to suppress the adherence of fuel to the exhaust valve or to the cylinder wall surface. By doing this, it is possible to reduce the amount of unburned HC which is discharged to the exhaust passage in the form of liquid drops, so that it is possible to promote the oxidization reaction of the unburned HC in the exhaust passage, i.e. the after-burning.

In a fifth aspect of the present invention, in the fourth aspect, there is further included a fuel injection timing control device which controls the injection timing of fuel by a fuel injection valve into an intake port; and the fuel injection timing control device performs intake asynchronous injection in which the fuel injection timing is not synchronized with the opening period of the intake valve, for a predetermined period after the exhaust temperature has attained the temperature at which it is possible for after-burning to occur.

According to this fifth aspect of the present invention, by performing intake asynchronous injection in which the fuel injection timing is not synchronized with the opening period of the intake valve, it is possible to atomize the fuel within the intake port, and thus to suppress the flowing in of the fuel into the combustion chamber in the form of liquid drops. Due to this, it is possible more effectively to reduce the amount of unburned HC which is discharged in the form of liquid drops into the exhaust passage, and it is accordingly possible to promote after-burning within the exhaust passage.

In a sixth aspect of the present invention, in any one of the first through the fifth aspects, there are further included an air/fuel ratio control device which controls air/fuel ratio, and a device which measures or estimates the negative pressure in the intake pipe; and the air/fuel ratio control device sets the air/fuel ratio to lean until the intake pipe negative pressure reaches a predetermined reference negative pressure, and sets the air/fuel ratio to rich after the intake pipe negative pressure reaches the predetermined reference negative pressure.

According to this sixth aspect of the present invention, by setting the air/fuel ratio to lean until the intake pipe negative pressure becomes somewhat great, it is possible to reduce the amount of fuel which flows into the combustion chamber in the form of liquid drops, so that it is possible to reduce the amount of unburned HC which is discharged. Moreover, by setting the air/fuel ratio to be rich when the intake pipe negative pressure has become somewhat great and the fuel evaporation characteristic has accordingly improved, it is possible to promote the warming up of the catalyst by making possible the after-burning of the unburned HC within the exhaust passage.

Furthermore, according to a seventh aspect of the present invention, in a control device for an internal combustion engine which, by supplying secondary air to the upstream of a catalyst in an exhaust passage, performs after-burning of unburned HC in the exhaust gas within the exhaust passage, there are included an exhaust valve timing control device which controls the valve timing of an exhaust valve, and a device which measures or estimates exhaust temperature; and the exhaust valve timing control device: until the first cycle during engine starting has been completed, sets the opening timing of the exhaust valve more to the retarded side than its setting during the second and subsequent cycles; during the second and subsequent cycles, sets the closing timing of the exhaust valve more to the advance side than intake top dead center; and when, during the second and subsequent cycles, the exhaust temperature has become elevated to a temperature at which it is possible for unburned HC within the exhaust gas to be after-burned within the exhaust passage, sets the opening timing of the exhaust valve more to the retarded side, than its opening timing which is set before the exhaust temperature has attained the temperature at which after-burning can take place.

Thus, according to this seventh aspect of the present invention, by, until the first cycle during engine starting has been completed, setting the opening timing of the exhaust valve more to the retarded side than its opening timing which is set during the second and subsequent cycles, it is possible to lengthen the combustion period within the combustion chamber during the first engine starting cycle, so that it is possible to promote the oxidization reaction of the fuel, and thus it is possible to reduce the amount of unburned HC which is generated. And by, during the second and subsequent cycles, setting the closing timing of the exhaust valve more to the advance side than intake top dead center, it is possible to confine the combustion gas discharged directly before the intake top dead center, which contains a large amount of unburned HC, within the combustion chamber, so that it is possible further to reduce the amount of unburned HC which is discharged from the combustion chamber. Moreover by retarding the opening timing of the exhaust valve when the exhaust temperature has become elevated to a temperature at which it is possible for after-burning to take place, it is possible to promote the after-burning of the unburned HC by introducing the secondary air into the exhaust passage. According to the sequence of control described above, during starting of the internal combustion engine, and in particular during cold engine starting thereof, it is possible to reduce the amount of unburned HC which is discharged.

Furthermore, according to an eighth aspect of the present invention, in a control device for an internal combustion engine which, by supplying secondary air to the upstream of a catalyst in an exhaust passage, performs after-burning of unburned HC in the exhaust gas within the exhaust passage, there are included an exhaust valve timing control device which controls the valve timing of an exhaust valve, an intake valve timing control device which controls the valve timing of an intake valve; and a device which measures or estimates exhaust temperature; and the exhaust valve timing control device, until the first cycle during engine starting has been completed, sets the opening timing of the exhaust valve more to the retarded side than its setting during the second and subsequent cycles, and, during the second and subsequent cycles, sets the closing timing of the exhaust valve more to the advance side than intake top dead center; and the intake valve timing control device, until the exhaust temperature has become elevated to a temperature at which it is possible for unburned HC within the exhaust gas to be after-burned within the exhaust passage, sets the opening timing of the intake valve more to the retarded side, than its opening timing which is set after the exhaust temperature has become elevated to a temperature at which it is possible for unburned HC within the exhaust gas to be after-burned within the exhaust passage.

Furthermore, according to this eighth aspect of the present invention, by, until the first cycle during engine starting has been completed, setting the opening timing of the exhaust valve more to the retarded side than its setting during the second and subsequent cycles, it is possible to lengthen the combustion period within the combustion chamber during the first engine starting cycle, so that it is possible to promote the oxidization reaction of the fuel, and thus it is possible to reduce the amount of unburned HC which is generated. And by, during the second and subsequent cycles, setting the closing timing of the exhaust valve more to the advance side than intake top dead center, it is possible to confine the combustion gas discharged directly before the intake top dead center, which contains a large amount of unburned HC, within the combustion chamber, so that it is possible further to reduce the amount of unburned HC which is discharged from the combustion chamber. Moreover by, until the exhaust temperature has become elevated to a temperature at which it is possible for after-burning to take place, retarding the opening timing of the intake valve more than its opening timing which is set after until the exhaust temperature has become elevated to a temperature at which it is possible for after-burning to take place, it is possible to anticipate an improvement in the combustion of the mixture gas within the combustion chamber, by increasing its intake flow speed into the combustion chamber. According to the sequence of control described above, even in a state when the exhaust temperature has not reached the temperature at which after-burning can take place, so that it is not possible to perform combustion processing of the unburned HC by after-burning to a sufficient extent, nevertheless it is still possible to reduce the amount of unburned HC which is discharged.

And, according to a ninth aspect of the present invention, in a control method for an internal combustion engine in which after-burning of unburned HC in the exhaust gas is caused within an exhaust passage by supplying secondary air to the upstream of a catalyst in the exhaust passage, there is provided an exhaust valve timing control device; and the valve timing of an exhaust valve is controlled by the exhaust valve timing control device so as, during supply of the secondary air, to control the pressure within the exhaust passage by controlling the opening timing of the exhaust valve.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3A shows the valve timing during the first engine starting cycle, FIG. 3B shows the valve timing during the second and subsequent engine starting cycles, FIG. 3C shows the valve timing after the fuel has arrived at a temperature at which after-burning is possible, and FIG. 3D shows the valve timing during normal operation after engine starting has been completed;

FIGS. 4A through 4E are time charts for explanation of the beneficial effects of the routine shown in FIG. 2;

FIG. 9A shows the valve timing during the first engine starting cycle, FIG. 9B shows the valve timing during the second and subsequent engine starting cycles, FIG. 9C shows the valve timing after the fuel has arrived at a temperature at which after-burning is possible, FIG. 9D shows the valve timing after the fuel has arrived at a temperature at which it no longer adheres to the wall surface of the cylinder, and FIG. 9E shows the valve timing during normal operation after engine starting has been completed;

FIGS. 10A through 10G are time charts for explanation of the beneficial effects of the routine shown in FIG. 8.

DETAILED DESCRIPTION OF THE PREFERRED EMBODIMENTS

Embodiment 1

In the following, a first embodiment of the present invention will be described with reference to FIGS. 1 through 5.

Figure 1:
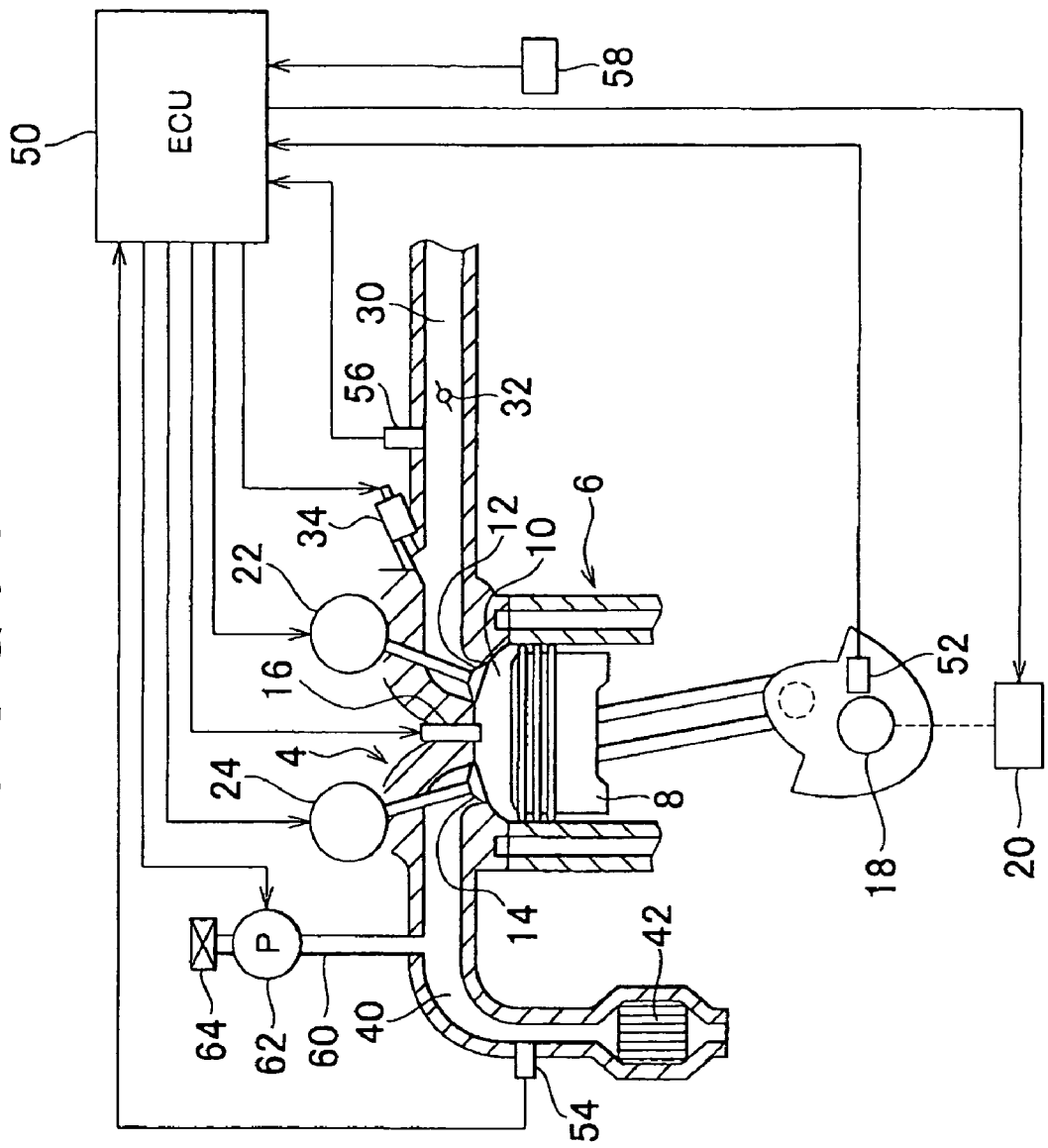
FIG. 1 is a general structural diagram of an internal combustion engine to which a control device according to a first embodiment of the present invention is applied.

FIG. 1 is a general structural diagram of an internal combustion engine to which a control device according to a first embodiment of the present invention is applied. The internal combustion engine of this embodiment is four stroke spark ignition type engine. This internal combustion engine comprises a cylinder block 6 in the interior of which is disposed a piston 8 which is connected to a crank shaft 18 by a connecting rod, and a cylinder head 4 which is assembled to this cylinder block 6. A combustion chamber 10 is defined by the space from the upper surface of the piston 8 to the cylinder head 4, and an intake pipe 30 and an exhaust pipe 40 (an exhaust passage) are connected to the cylinder head 4, so as to communicate with this combustion chamber 10. A spark plug 16 is fitted to the head portion of the combustion chamber 10.

An intake valve 12 which controls the state of communication between the intake pipe 30 and the combustion chamber 10 is provided at the portion where the intake pipe 30 and the combustion chamber 10 are connected. An intake valve timing control device 22 is provided to this intake valve 12, and controls the valve timing of this valve in a variable manner. On the other hand, an exhaust valve 14 which controls the state of communication between the exhaust pipe 40 and the combustion chamber 10 is provided at the portion where the exhaust pipe 40 and the combustion chamber 10 are connected. And an exhaust valve timing control device 24 is provided to this exhaust valve 14, and controls the valve timing of this valve in a variable manner. In this embodiment it is supposed that, for this intake valve timing control device 22 and this exhaust valve timing control device 24, there are used variable valve timing mechanisms (VVTs) which, by varying the phase angle of a camshaft (not shown in the figures) with respect to the crank shaft 18, advance or retard the opening and closing timings of the respective valves while keeping their operating angles constant.

A throttle 32 is provided in the intake pipe 30. The downstream portion of the intake pipe 30 is branched off to each of the cylinders, and an injector 34 for injecting fuel is provided in each of these branched off conduits. In the exhaust pipe 40, there is provided a catalyst 42 for eliminating the harmful components in the combustion gas which is discharged from the combustion chamber 10. Furthermore, upstream of the catalyst 42 in the exhaust pipe 40, there is connected a secondary air supply conduit 60 for supplying secondary air to within the exhaust pipe 40. In this secondary air supply conduit 60, there are provided an air pump 62 for intake of external air, and an air filter 64 for filtering this external air which is taken into the secondary air supply conduit 60. The air pump 62 may be a mechanical pump which is driven by the internal combustion engine, or may be an electrically operated pump which is driven by a motor.

Furthermore, the internal combustion engine according to this embodiment of the present invention is provided with an ECU (Electronic Control Unit) 50, which is a device for controlling the engine. To the output side of this ECU 50, apart from the previously described valve timing control devices 22 and 24, the injector 34, the throttle 32, the spark plug 16, and the air pump 62, there are also connected various devices such as a starter 20 and the like. And, to the input side of this ECU 50, there are connected various sensors such as a crank angle sensor 52, an exhaust temperature sensor 54, an intake pipe pressure sensor 56 and the like, and various switches such as a start switch 58 and the like. The crank angle sensor 52 is a sensor which outputs a signal according to the rotational angle of the crank shaft 18. The exhaust temperature sensor 54 is a sensor which outputs a signal according to the temperature within the exhaust pipe 40, and it is positioned upstream of the catalyst 42 in the exhaust pipe 40. The intake pipe pressure sensor 56 is a sensor which outputs a signal according to the pressure within the intake pipe 30, and it is positioned downstream of the throttle 32 in the intake pipe 30. And, based upon the outputs of the various sensors and switches, the ECU 50 drives various devices according to a control program.

When starting the internal combustion engine from cold, the ECU 50 performs secondary air supply control. This secondary air supply control is a form of control whose objective is to cause the unburned HC in the exhaust gas to be re-combusted (after-burned) within the exhaust passage by supplying external air, taken in by the air pump 62, into the exhaust pipe 40 as secondary air. It is possible to promote warming up of the catalyst 42 due to the heat of combustion which is generated by the after-burning of the unburned HC, which further elevates the exhaust temperature. In this secondary air supply control, the ECU 50 is arranged to cause the air pump 60 to operate simultaneously with the start switch 58 being turned ON, and to stop the operation of the air pump 60 when the catalyst 42 has been fully warmed up. It should be understood that the rotational speed of the air pump 60 during operation is set to a constant value.

According to the above described secondary air supply control, at the same time as it being possible to perform combustion processing of the unburned HC in the exhaust gas, it is also possible to promote the warming up of the catalyst 42, so that it is possible to enhance the exhaust emissions from the engine during engine starting up from cold. However, the after-burning of the unburned HC within the exhaust pipe 40 is a phenomenon which takes place when the temperature within the exhaust pipe 40 has become elevated to a certain extent, and, in the state directly after engine starting in which the exhaust temperature has not become sufficiently elevated, even if it is arranged to supply secondary air, it is not possible to anticipate after-burning of the unburned HC. Due to this, it is necessary to suppress the discharge of unburned HC by some method until after-burning of the unburned HC within the exhaust pipe 40 becomes possible.

Figure 2:
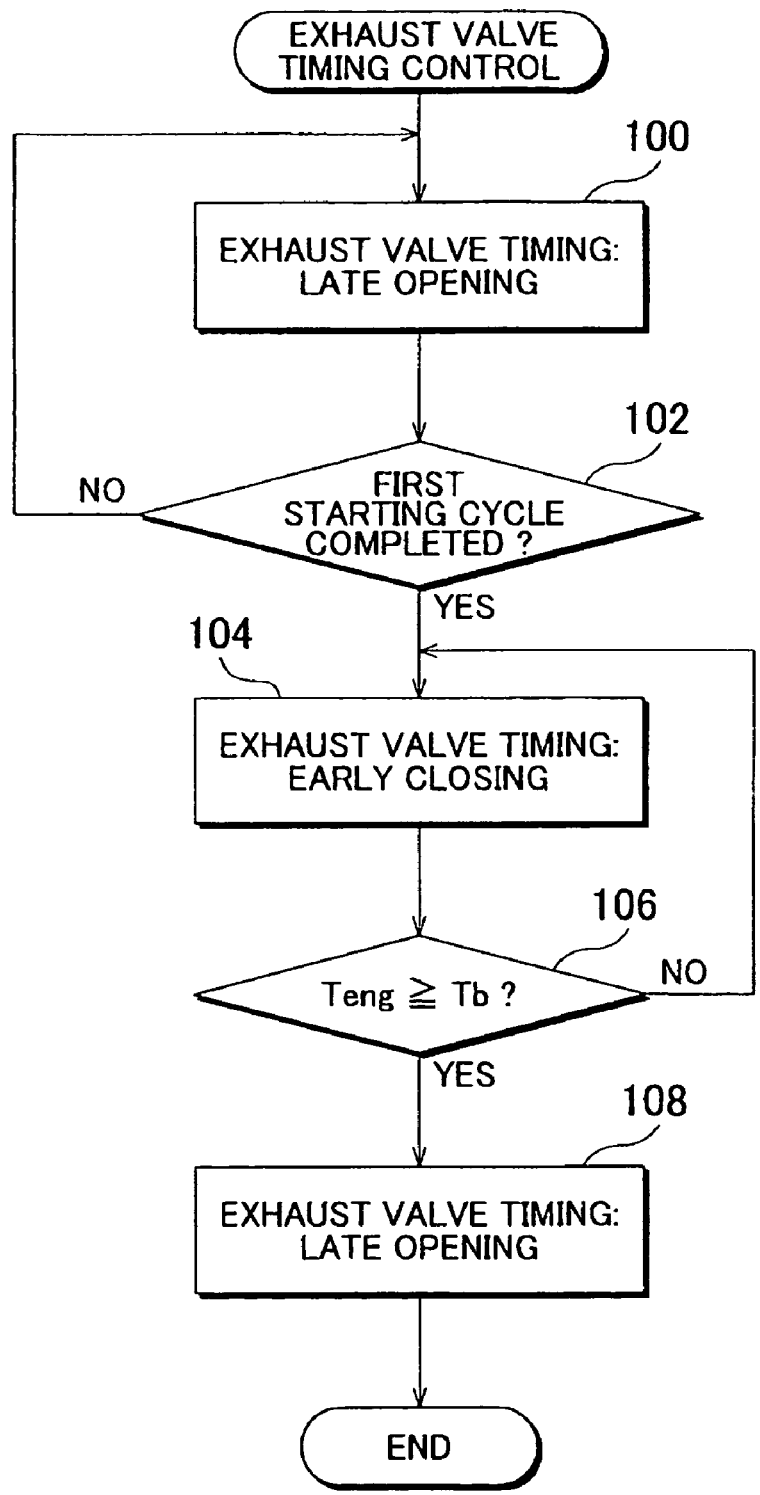
FIG. 2 is a flow chart showing an exhaust valve timing control routine which is executed in this first embodiment of the present invention.

Thus, when starting the internal combustion engine from cold, directly after engine starting, it is planned for the ECU 50 to suppress the discharge of unburned HC by executing, in parallel with the above described secondary air supply control, exhaust timing valve control as will be explained hereinafter. FIG. 2 is a flow chart showing the details of an exhaust valve timing control routine which is executed by the ECU 50 of this first embodiment of the present invention. The routine shown in FIG. 2 is executed simultaneously with the start switch 58 being turned ON, and cranking of the internal combustion engine being initiated. Furthermore, this routine is executed separately for each of the cylinders of the engine.

In the initial step 100 of this routine, the exhaust valve timing is set to retarded opening by the exhaust valve timing control device 24. In other words, the opening timing of the exhaust valve 14 is set to the retarded side of normal. Here, by the normal opening timing of the exhaust valve 14, is meant the opening timing which is set after engine starting has been completed, and this is the optimum opening timing in terms of performing exhaust so that, according to the quality of gas exchange, no combustion gas remains into the next cycle. In concrete terms, it is desirable for this to be in the neighborhood of 45° BBDC (before exhaust bottom dead center). In this embodiment, it is accordingly supposed that the normal opening timing of the exhaust valve 14 is set to 45° BBDC.

Figure 3A:
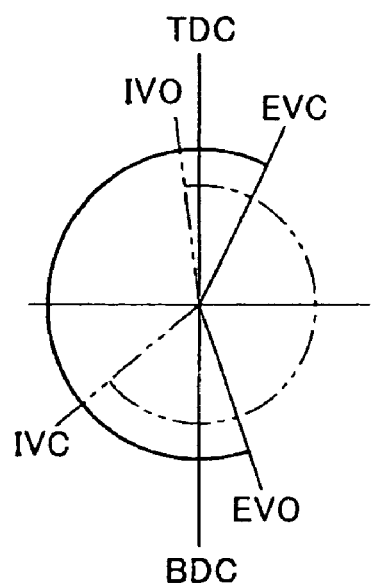
FIGS. 3A through 3D are figures showing the valve timing of an intake valve and an exhaust valve according to this first embodiment of the present invention.
Figure 3B:
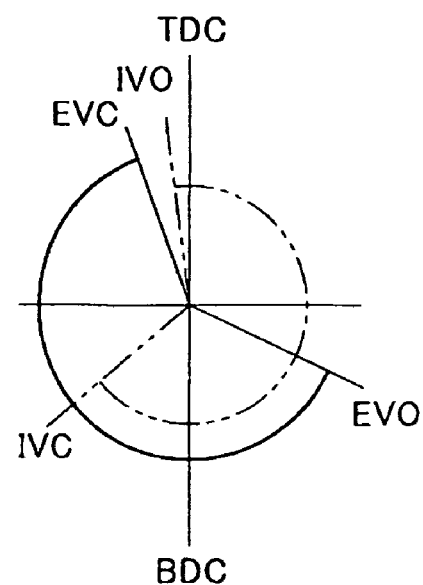
Figure 3C:
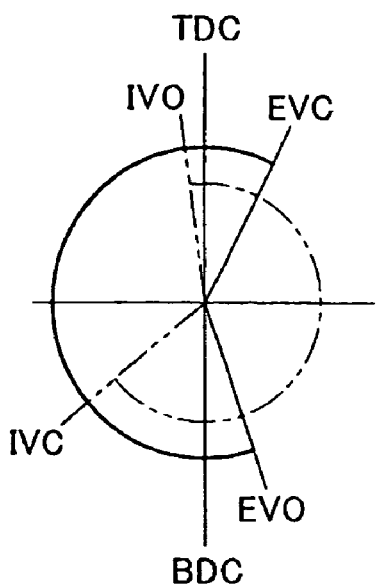
Figure 3D:
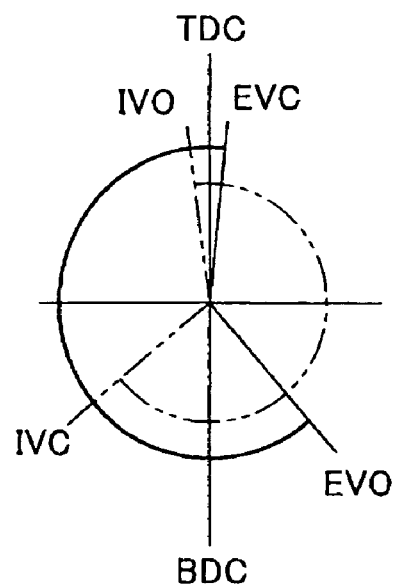

FIGS. 3A through 3D are figures showing the valve timings of the intake valve 12 and the exhaust valve 14. The valve timings shown in FIG. 3D are the valve timings during normal engine operation, while the valve timings shown in FIG. 3A are the valve timings which are set in the step 100. In these figures, "EVO" denotes the opening timing of the exhaust valve 14, "EVC" denotes the closing timing of the exhaust valve 14, "IVO" denotes the opening timing of the intake valve 12, and "IVC" denotes the closing timing of the intake valve 12. As will be understood by comparison of FIGS. 3A and 3D, in this step 100, EVO is set so as to be closer to BDC than during normal operation, in other words to be closer to BDC than 45° BBDC. It should be understood that, here, the intake valve timing is set to be the same timing as during normal operation.

In the next step 102, a decision is made as to whether or not the first engine starting cycle of this cylinder has been completed. It is possible to decide as to whether or not the first engine starting cycle has been completed, from the rotational angle of the crank shaft 18 which is measured from the signal of the crank angle sensor 52. After the start switch 58 is turned ON, cranking of the internal combustion engine is performed by the starter 20, and, when the engine rotational speed has exceeded the rotational speed required for initial explosion, then fuel for the initial explosion is injected from the injector 34. That cycle in which this fuel for the initial explosion is injected is the first engine starting cycle, and the exhaust valve timing from when the cranking of the internal combustion engine is initiated until the end of the first engine starting cycle is kept at the timing which was set in the step 100.

If the first engine starting cycle has ended, in other words from the second engine starting cycle and subsequently, the exhaust valve timing is changed from late opening to early closing (a step 104). The valve timing shown in FIG. 3B is the valve timing which is set by this step 104. As will be understood by comparison of FIG. 3B and FIG. 3D, in this step 104, the EVC is set more to the advance side than during normal operation; in concrete terms, it is set to the advance side past TDC. From this second engine starting cycle, until the condition of the next step 106 becomes effective, the exhaust valve timing is kept at the valve timing which has been set in this step 104. It should be understood that no change of the intake valve timing is made; just as during the first engine starting cycle, it is set to the same timing as during normal operation.

In the step 106, a decision is made as to whether or not the exhaust temperature Teng, as measured from the signal of the exhaust temperature sensor 54, is greater than or equal to a predetermined reference temperature Tb. This reference temperature Tb is the exhaust temperature at which it becomes possible to perform after-burning of the unburned HC within the exhaust pipe 40. Normally, this exhaust temperature at which it is possible to perform after-burning is attained in about five cycles after engine starting. If the result of the decision in this step 106 is that the exhaust temperature Teng has become greater than or equal to the reference temperature Tb, then the exhaust valve timing is changed from early closing back to late opening (a step 108). The valve timing shown in FIG. 3C is the valve timing which is set by this step 108. Just as in the case of the valve timing shown in FIG. 3A, the EVO is set so as to be closer to BDC than during normal operation, in other words closer than BBDC 45°.

Later, the exhaust valve timing control during engine starting is ended at the time point at which the warming up of the catalyst 42 has been completed, and thereafter the exhaust valve timing control during normal operation is performed by a different routine from the one shown in FIG. 2, not shown in the figures. In this exhaust valve timing control during normal operation, the exhaust valve timing is changed from late opening to the normal valve timing, in other words to the valve timing shown in FIG. 3D. It should be understood that whether or not the warming up of the catalyst 42 has been completed may be decided according to the temperature of the catalyst 42, or according to the exhaust temperature, or according to the elapsed time from engine starting or the like.

FIGS. 4A through 4E are figures showing, as time charts, the results of executing the exhaust valve timing control routine explained above. FIG. 4A shows the engine rotational speed (Ne); FIG. 4B shows the advance angle of EVC with respect to TDC (BTDC); and FIG. 4C shows the advance angle of EVO with respect to BDC (BBDC). Moreover, FIG. 4D shows the exhaust temperature as measured by the exhaust temperature sensor 54, and FIG. 4E shows the amount of unburned HC which is discharged. In FIGS. 4B and 4C, the solid line shows the setting of the exhaust valve timing by the routine according to the embodiment of the present invention described above, while the broken line shows the setting of the exhaust valve timing according to the prior art (the same setting as during normal operation). Furthermore, in FIG. 4D, the solid line shows the exhaust temperature which is implemented by the execution of the routine according to the embodiment of the present invention described above, while the broken line shows the exhaust temperature which is implemented with the setting of the exhaust valve timing according to the prior art. Moreover, in FIG. 4E, the solid line shows the discharge amount of unburned HC which is implemented by the execution of the routine according to the embodiment of the present invention described above, while the broken line shows the discharge amount of unburned HC which is implemented by the setting of the exhaust valve timing according to the prior art. It should be understood that, here, it is supposed that the ignition timing when starting the internal combustion engine from cold is set to a fixed value, and the target air/fuel ratio is set to richer than stoichiometric, in order to ensure that unburned HC will be after-burned within the exhaust pipe 40.

As shown in FIG. 4C, the amount of unburned HC which is discharged from the combustion chamber 10 along with opening of the exhaust valve 14 is decreased, by the EVO during the first engine starting cycle being set more to the retarded side than during normal operation (45° BBDC). This is attributed to the following reasons.

Figure 5:
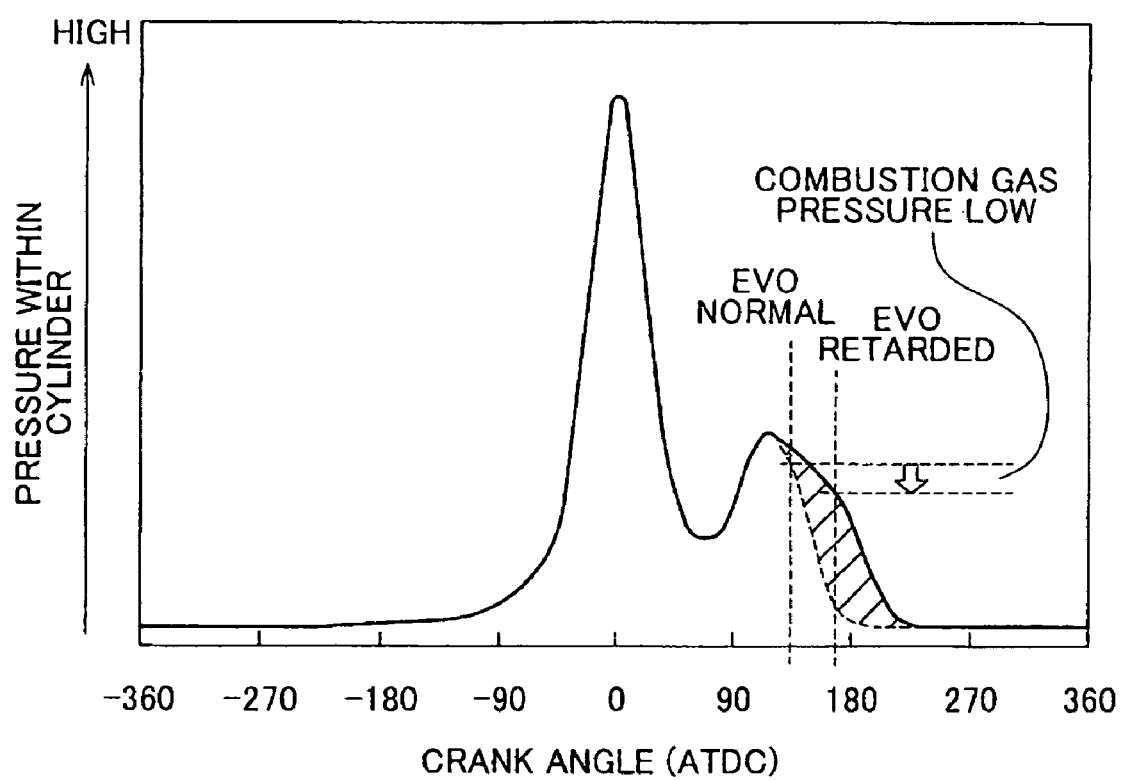
FIG. 5 is a figure showing the relationship between the EVO timing and change of pressure within the cylinder.

FIG. 5 is a figure showing the change of the combustion gas pressure within the combustion chamber 10 (i.e. of the internal cylinder pressure). The solid line in FIG. 5 shows the change of the pressure in the cylinder when the EVO is set more to the retarded side than 45° BBDC, while the broken line in FIG. 5 shows the change of pressure in the cylinder when the EVO is set to 45° BBDC (i.e. the change of pressure in the cylinder during normal operation). Although the pressure within the cylinder decreases abruptly along with opening of the exhaust valve 14, as shown in this figure, by retarding the EVO, it becomes possible to keep the pressure within the cylinder high over the region shown by diagonal hatching in the figure. In other words, it is possible to confine the fuel for the initial explosion within the combustion chamber 10 at high pressure for a longer time period, so that it becomes possible to promote the oxidization reaction of this fuel at conditions of high temperature and high pressure. Due to this, it is possible to reduce the amount of unburned HC which adheres to the cylinder wall surface, so that it is possible to reduce the amount of unburned HC which is discharged from the combustion chamber 10.

Furthermore, during the second and subsequent cycles in which some combustion gas remains within the combustion chamber 10, due to the EVC being set more to the advance side than TDC, even if some unburned HC which has adhered to the cylinder wall surface is brushed upwards due to rising of the piston 8, it is still possible to prevent this unburned HC from being discharged from the combustion chamber 10 along with the combustion gas. In other words, it is possible to confine the unburned HC which has adhered to the cylinder wall surface within the combustion chamber 10 along with the residual gas, so that it is possible to reduce the amount of unburned HC which is discharged from the combustion chamber 10. Moreover, the unburned HC which has been confined within the combustion chamber 10 is atomized by the residual gas, so that the beneficial effect is also reaped of promoting the oxidization reaction.

As described above, according to the exhaust valve timing control of this embodiment, it is possible to obtain a longer combustion period within the combustion chamber 10 by retarding the EVO during the first engine starting cycle, so that it is possible to promote the oxidization reaction of the fuel, and to reduce the amount of unburned HC which is generated. And, by advancing the EVC beyond TDC during the second and subsequent engine starting cycles, it is possible to confine the combustion gas including a large amount of unburned HC which is discharged directly before TDC within the combustion chamber 10, so that it is possible further to reduce the amount of unburned HC which is discharged from the combustion chamber 10. In other words it is still possible to prevent deterioration of the exhaust emissions, even in a state in which the exhaust temperature does not attain the temperature Tb at which after-burning becomes possible, so that it is not possible to anticipate the occurrence of after-burning of the unburned HC within the exhaust pipe 40.

Thereafter, the EVO is again retarded when the exhaust temperature has risen to the temperature Tb at which after-burning becomes possible. By thus retarding the EVO, as shown in FIG. 5, the combustion gas pressure when the exhaust valve 14 has opened drops, and, along with this, the pressure within the exhaust pipe 40 also drops. The supply amount of the secondary air into the exhaust pipe 40 is determined by the rotational speed of the air pump 62 and the pressure within the exhaust pipe 40, and, if the rotational speed of the air pump 62 is kept constant as is the case with this first preferred embodiment of the present invention, then it is possible to increase the supply amount of the secondary air by lowering the pressure within the exhaust pipe 40. Accordingly, by retarding the EVO, it is possible to introduce more secondary air into the exhaust pipe 40, and it becomes possible to promote after-burning of the unburned HC, thus further elevating the exhaust temperature.

After, in this manner, the exhaust temperature has reached the temperature Tb at which it is possible for after-burning to take place, by controlling the pressure within the exhaust pipe 40 according to the EVO and thus introducing secondary air in a simple and easy manner, along with it becoming possible to perform combustion processing of the unburned HC by after-burning in a reliable manner, it also becomes possible to promote the warming up of the catalyst 42, and to enhance the exhaust emissions during starting up of the internal combustion engine from cold. Moreover, conversely, since the EVO is set to the advance side until the exhaust temperature reaches the temperature Tb at which it is possible for after-burning to take place, accordingly the gas pressure of the exhaust gas which is discharged from the combustion chamber 10 while the exhaust valve 14 is open is elevated, so that it becomes possible to elevate the pressure within the exhaust pipe 40. As a result, the introduction of secondary air into the exhaust pipe 40 is hampered, and delay in the elevation of the exhaust temperature due to the introduction of secondary air at low temperature is prevented. In other words, by setting the EVO to the advance side until the exhaust temperature reaches the temperature Tb at which it is possible for after-burning to take place, it is possible to prevent delay in the warming up of the catalyst 42.

Embodiment 2

Next, a second embodiment of the present invention will be explained with reference to FIGS. 6 through 7E.

Figure 6:
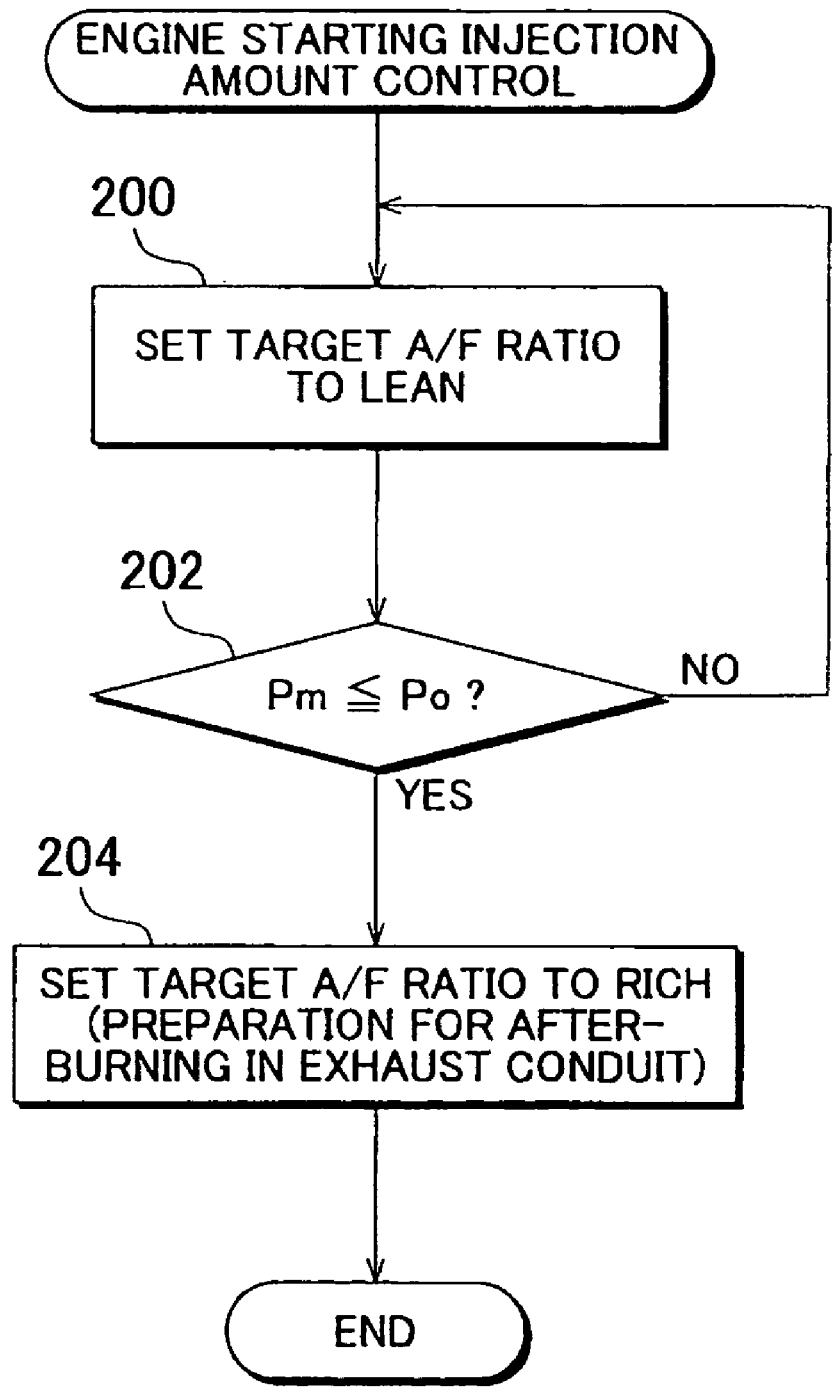
FIG. 6 is a flow chart showing an engine starting injection amount control routine which is executed in a second embodiment of the present invention.
Figure 7:
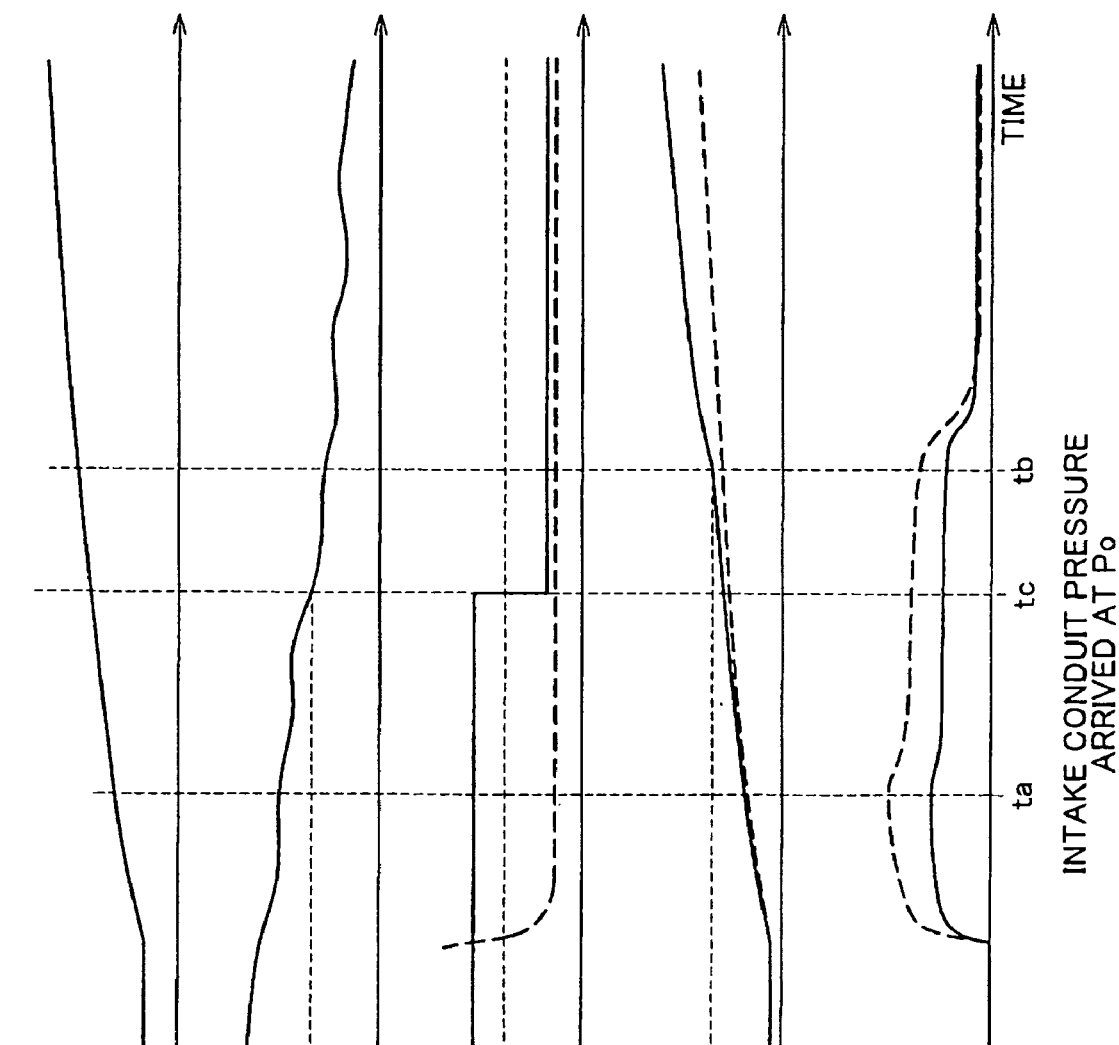
FIGS. 7A through 7E are time charts for explanation of the beneficial effects of the routine shown in FIG. 6.

The control device according to the second embodiment of the present invention is applied to an internal combustion engine which has the same structure as that of the engine of the first embodiment, while execution of the routine shown in FIG. 6 is implemented upon its ECU 50, in parallel with the routine (for exhaust valve timing control) shown in FIG. 2. In this routine shown in FIG. 6, control of the fuel injection amount during starting of the internal combustion engine is performed. The routine shown in FIG. 6 is executed at the same time that the start switch 58 is turned ON and cranking of the internal combustion engine is initiated. Furthermore, this routine is executed for each one of the cylinders individually.

In the initial step 200 of this routine, the target air/fuel ratio (A/F) is set to a value (a fixed value) which is leaner than stoichiometric. In the next step 202, a decision is made as to whether or not the intake pipe pressure Pm, as measured by the intake pipe pressure sensor 56, has dropped to less than or equal to a predetermined reference pressure Po. This reference pressure Po is a pressure at which the fuel which is injected into the intake pipe 30 can evaporate adequately, and is determined based upon experiment or the like. Until the intake pipe pressure Pm becomes less than or equal to the reference pressure Po, the target air/fuel ratio is kept at lean. And, when the intake pipe pressure Pm becomes less than or equal to the reference pressure Po, in the next step 204 the target air/fuel ratio is set to a value (a fixed value) which is richer than stoichiometric.

FIGS. 7A through 7E are time charts for explanation of the results of executing the engine starting injection amount control routine explained above and shown in FIG. 6. FIG. 7A shows the engine rotational speed (Ne), while FIG. 7B shows the intake pipe pressure and FIG. 7C shows the target air/fuel ratio (A/F). Moreover, FIG. 7D shows the exhaust temperature as measured by the exhaust temperature sensor 54, and FIG. 7E shows the amount of unburned HC which is discharged. In FIG. 7C, the solid line shows the setting of the target air/fuel ratio according to the above described routine according to this second embodiment of the present invention, while the broken line shows the setting of the target air/fuel ratio according to the prior art. It should be understood that, here, in the same manner as in the case of the first embodiment, it is supposed that, during cold starting of the internal combustion engine, the ignition timing is set to a fixed value. Furthermore, the timing of the exhaust valve 14 is controlled by the routine shown in FIG. 2. In FIG. 7D, the solid line shows the exhaust temperature which is implemented by executing the above described routine according to this second embodiment of the present invention and also the routine shown in FIG. 2, while the broken line shows the exhaust temperature which is implemented by setting the target air/fuel ratio and the exhaust valve timing according to the prior art. Moreover, in FIG. 7E, the solid line shows the amount of unburned HC which is discharged by implementing the execution of the above described routine according to this second embodiment of the present invention and also the routine shown in FIG. 2, while the broken line shows the amount of unburned HC which is discharged by implementing the setting of the target air/fuel ratio and the exhaust valve timing according to the prior art.

As shown in FIGS. 7A and 7B, after the internal combustion engine has started, the intake pipe pressure gradually decreases along with elevation of the engine rotational speed, and, before long, as the exhaust temperature reaches the temperature Tb at which after-burning can take place, the intake pipe pressure drops to the reference pressure Po. According to this type of change of the intake pipe pressure, the target air/fuel ratio (A/F) is not immediately set to rich directly after starting of the internal combustion engine as was the case in the prior art; rather, it is set to lean during a brief period after starting of the engine. And, as it becomes possible for after-burning of the unburned HC in the exhaust pipe 40 to occur, the target air/fuel ratio (A/F) is set to rich. This control of the air/fuel ratio according to the intake pipe pressure in this manner offers the following beneficial aspects.

The fuel which has been injected from the injector 34 becomes capable of combustion by evaporating and becoming fuel vapor, but the evaporation characteristic of the fuel at this time depends upon the pressure in the intake pipe 30 into which the fuel is injected. In concrete terms, the lower is the pressure in the intake pipe (i.e. the larger is the intake pipe negative pressure), the more is the evaporation characteristic of the fuel enhanced. To put it in another manner, when the pressure in the intake pipe is high (i.e. when the intake pipe negative pressure is small), the lower is the evaporation characteristic of the fuel, and the higher becomes the proportion of the fuel which flows into the combustion chamber 10 in the form of liquid drops. This fuel in liquid form is not combusted within the combustion chamber 10, and moreover is not combusted by after-burning within the exhaust pipe 40, but comes to be discharged just as it is to the atmosphere.

In order to promote the warming up of the catalyst 42, it is desirable to set the target air/fuel ratio to richer than stoichiometric, in order to ensure that the unburned HC is after-burned within the exhaust pipe 40. However, in the state in which the fuel cannot be adequately evaporated, even if the target air/fuel ratio is set to rich, merely the amount of unburned HC in liquid from which cannot be subjected to combustion processing increases, so that, if anything, the exhaust emissions are undesirably deteriorated.

According to the engine starting injection amount control routine described above, by setting the target air/fuel ratio to leaner than stoichiometric until the intake pipe pressure becomes somewhat low (i.e. the intake pipe negative pressure becomes somewhat high), it is possible to reduce the amount of fuel which flows into the combustion chamber 10 in the form of liquid drops, so that it is possible to reduce the amount of unburned HC which is discharged. Moreover, by setting the target air/fuel ratio to richer than stoichiometric when the intake pipe pressure becomes somewhat low so that the evaporation characteristic of the fuel has improved, it is possible to enable after-burning of the unburned HC within the exhaust pipe 40, thus making it possible to promote the warming up of the catalyst 42. Accordingly, by executing the engine starting injection amount control routine described above in parallel with the routine shown in FIG. 2, it becomes possible further to reduce the amount of unburned HC which is discharged.

It should be understood that although, in the time charts of FIG. 7B and FIG. 7D, the exhaust temperature reaches the temperature Tb at which after-burning is possible after the intake pipe pressure has decreased down to the reference pressure Po, it is also contemplated that, according to the operating conditions of the internal combustion engine, the intake pipe pressure may decrease down to the reference pressure Po, after the exhaust temperature has reached the temperature Tb at which after-burning is possible. In this case as well, by maintaining the target air/fuel ratio at lean until the intake pipe pressure has decreased down to the reference pressure Po, and by changing the target air/fuel ratio (A/F) to rich when the intake pipe pressure has become less than or equal to the reference pressure Po, it is possible to anticipate a reduction in the amount of the unburned HC which is discharged.

Embodiment 3

Next, a third embodiment of the present invention will be explained with reference to FIGS. 8 through 10G

Figure 8:
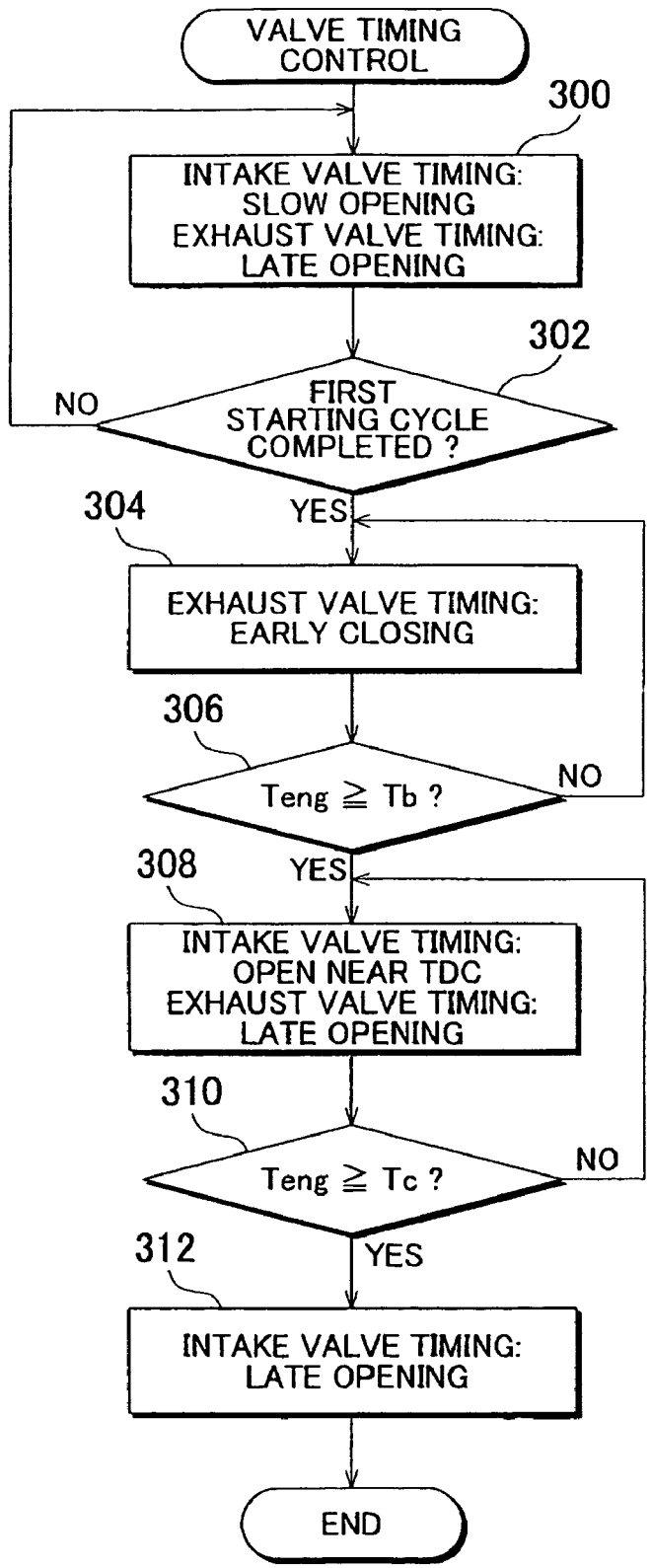
FIG. 8 is a flow chart showing an valve timing control routine which is executed in a third embodiment of the present invention.

The control device according to the third embodiment of the present invention is applied to an internal combustion engine which has the same structure as that of the engine of the first embodiment, while in the ECU 50, instead of the routine (for exhaust valve timing control) shown in FIG. 2, execution of the routine shown in FIG. 8 is implemented. The routine shown in FIG. 8 is a routine which is executed in parallel with secondary air supply control, just like the routine shown in FIG. 2; and, in this routine, both the valve timing of the intake valve 12 and the valve timing of the exhaust valve 14 are controlled. The routine of FIG. 8 is executed at the same time that the start switch 58 is turned ON and cranking of the internal combustion engine is initiated. Furthermore, this routine is executed for each one of the cylinders individually.

In the initial step 300 of this routine, the intake valve timing is set to late opening by the intake valve timing control device 22. In other words, the opening timing of the intake valve 12 is set more towards the retarded side than during normal operation. Here, by the opening timing of the intake valve 12 during normal operation, is meant the opening timing which is set after the engine starting procedure has been completed. In concrete terms, this normal opening timing is set somewhat more towards the advanced side than TDC, so as to obtain a desired valve overlap.

Furthermore, in this step 300, the exhaust valve timing is set to late opening by the exhaust valve timing control device 24. In other words, the opening timing of the exhaust valve 14 is set more towards the retarded side than during normal operation. The opening timing of the exhaust valve 14 which is set here is the same as the opening timing which is set in the step 100 of the routine shown in FIG. 2.

Figure 9A:
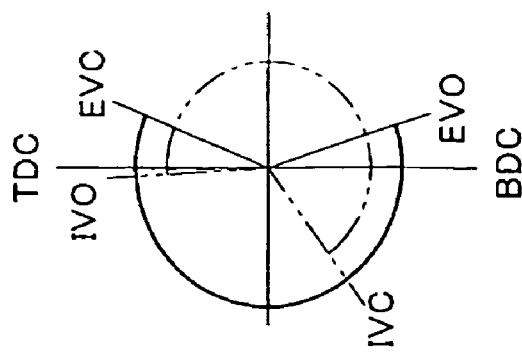
FIGS. 9A through 9E are figures showing the valve timing of the intake valve and the exhaust valve according to this third embodiment of the present invention.
Figure 9B:
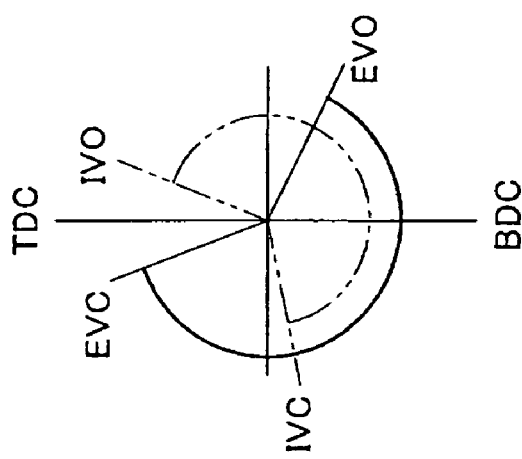
Figure 9C:
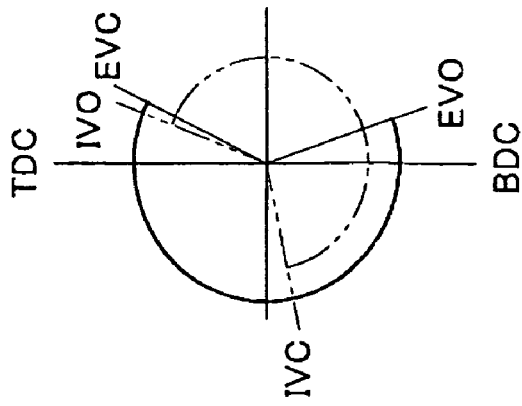
Figure 9D:
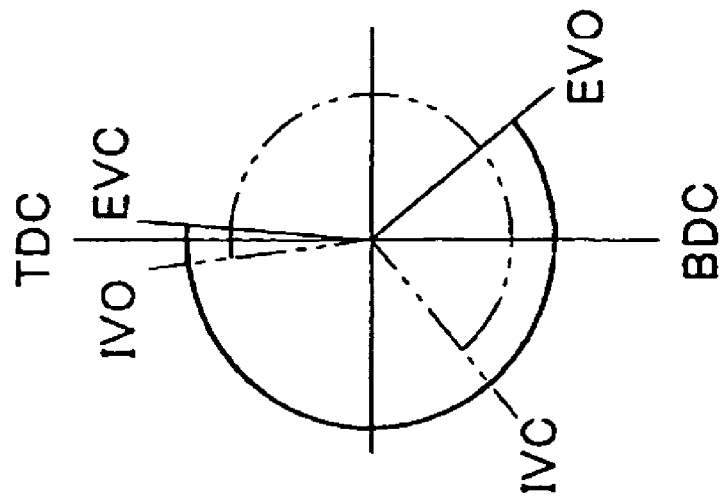
Figure 9E:
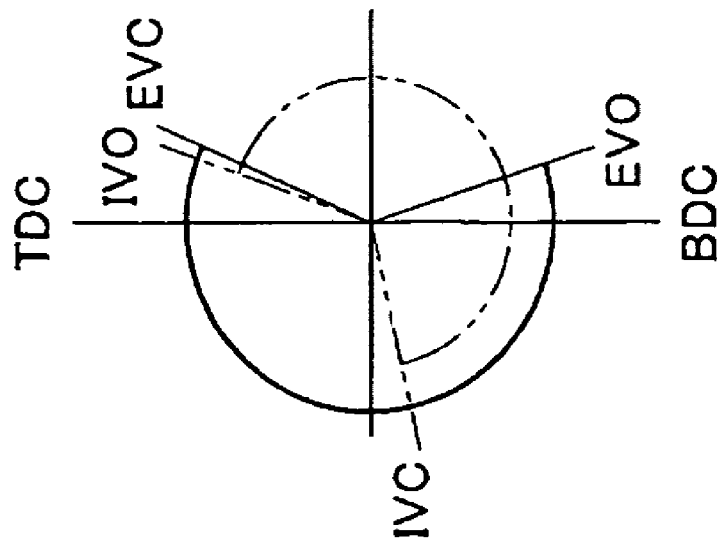

FIGS. 9A through 9E are figures showing the valve timing of the intake valve 12 and the exhaust valve 14 according to this third embodiment of the present invention. FIG. 9E shows the valve timing during normal operation, and FIG. 9A shows the valve timing which is set in the step 300. In these figures, EVO denotes the opening timing of the exhaust valve 14, EVC denotes the closing timing of the exhaust valve 14, IVO denotes the opening timing of the intake valve 12, and IVC denotes the closing timing of the intake valve 12. As will be understood from comparison of FIG. 9A and FIG. 9E, in this step 300, the IVO is set much more towards the retarded side than TDC, while, at the same time, the EVO is set closer to BDC than during normal operation, in other words than 45° BBDC.

In the next step 302, a decision is made as to whether or not the first engine starting cycle for this cylinder has been completed. It is possible to decide as to whether or not the first engine starting cycle has been completed, from the rotational angle of the crank shaft 18 which is measured from the signal of the crank angle sensor 52. After the start switch 58 is turned ON, cranking of the internal combustion engine is performed by the starter 20, and, when the engine rotational speed has exceeded the rotational speed required for initial explosion, then fuel for the initial explosion is injected from the injector 34. That cycle in which this fuel for the initial explosion is injected is the first engine starting cycle, and the intake valve timing and the exhaust valve timing from when the cranking of the internal combustion engine is initiated until the end of the first engine starting cycle are kept at the timings which were set in the step 300.

If the first engine starting cycle has ended, in other words from the second engine starting cycle and subsequently, the exhaust valve timing (only) is changed from late opening to early closing (a step 304). Change of the intake valve timing is not performed; it is kept at the same valve timing as during the first engine starting cycle. The valve timing shown in FIG. 9B is the valve timing which is set by this step 304. As will be understood by comparison of FIG. 9B and FIG. 9E, in this step 304, the EVC is set more to the advance side than during normal operation; in more concrete terms, it is set to the advance side past TDC. From this second engine starting cycle, until the condition of the next step 306 becomes effective, the exhaust valve timing is kept at the valve timing which has been set in this step 304.

In the next step 306, a decision is made as to whether or not the exhaust temperature Teng, as measured from the signal of the exhaust temperature sensor 54, is greater than or equal to a first reference temperature Tb. This first reference temperature Tb is the exhaust temperature at which it becomes possible to perform after-burning of the unburned HC within the exhaust pipe 40. If the result of the decision in this step 306 is that the exhaust temperature Teng has become greater than or equal to the first reference temperature Tb, then the intake valve timing is controlled to the advanced side so that it opens in the vicinity of TDC, and the exhaust valve timing is changed from early closing back to late opening (a step 308). The valve timing shown in FIG. 9C is the valve timing which is set by this step 308. The IVO is set to be in the vicinity of TDC, and, just as in the case of the valve timing shown in FIG. 9A, the EVO is set so as to be closer to BDC than BBDC 45°. And the intake valve timing and the exhaust valve timing are kept at the valve timings set in this step 308, until the condition in the next step 310 becomes effective.

In this step 310, a decision is made as to whether or not the exhaust temperature Teng, as measured from the signal of the exhaust temperature sensor 54, is greater than or equal to a second reference temperature Tc. This second reference temperature Tc is the exhaust temperature at which the adherence of the fuel which has flowed into the combustion chamber 10 to the cylinder wall surface ceases or has become so low as to be neglected. If the result of the decision in this step 310 is that the exhaust temperature Teng has become greater than or equal to the second reference temperature Tc, then the intake valve timing is changed from opening at TDC back to late opening (a step 312). Moreover, no change of the exhaust valve timing is performed, and it is kept at late opening, just as it is. The valve timings shown in FIG. 9D are the valve timings which are set in this step 312. Just as with the valve timings shown in FIG. 9A and FIG. 9B, the IVO is set greatly to the retarded side of TDC.

Later, the valve timing control during engine starting is ended at the time point at which the warming up of the catalyst 42 has been completed, and thereafter the exhaust valve timing control during normal operation is performed by a different routine from the one shown in FIG. 8, not shown in the figures. In this valve timing control during normal operation, the intake valve timing and the exhaust valve timing are both changed to the normal valve timing, in other words to the valve timing shown in FIG. 9E.

Figure 10E:
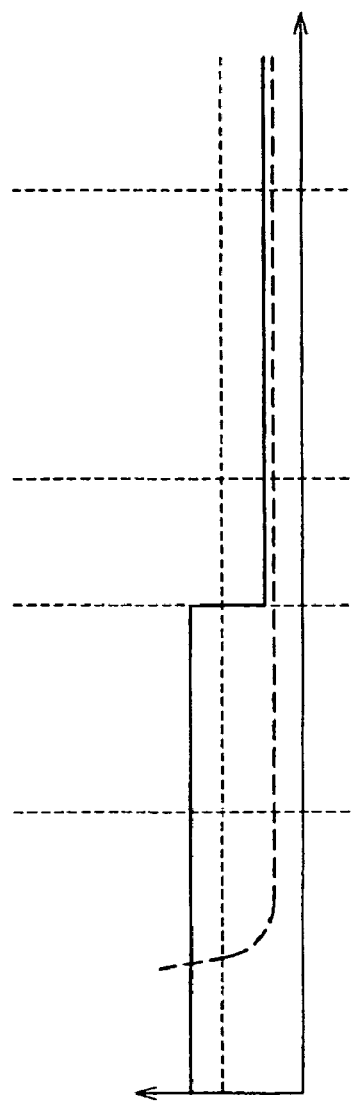
Figure 10F:
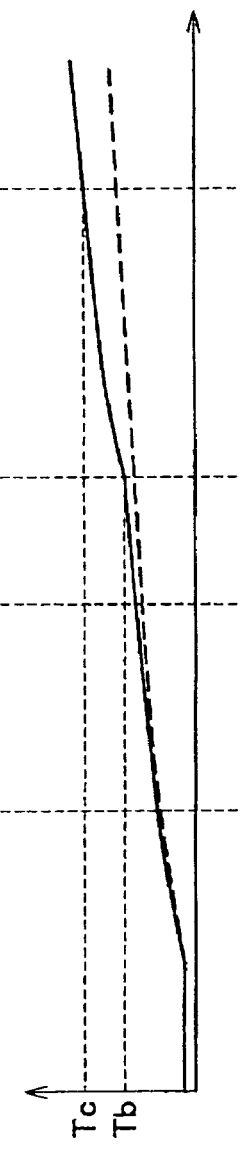
Figure 10G:
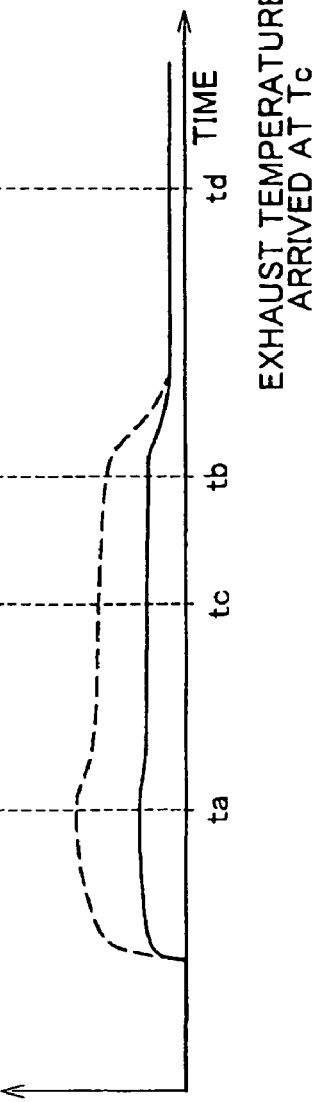

FIGS. 10A through 10G are time charts for explanation of the beneficial effects of the valve timing control routine explained above. FIG. 10A shows the engine rotational speed (Ne); FIG. 10B shows the advance angle of IVO with respect to TDC (BTDC); FIG. 10C shows the advance angle of EVC with respect to TDC (BTDC); and FIG. 10D shows the advance angle of EVO with respect to BDC (BBDC). Furthermore, FIG. 10E shows the target air/fuel ratio (A/F), FIG. 10F shows the exhaust temperature as measured by the exhaust temperature sensor 54, and FIG. 10G shows the amount of unburned HC which is discharged. In FIGS. 10B through 10D, the solid line shows the valve timing by the routine according to the embodiment of the present invention described above, while the broken line shows the valve timing according to the prior art (the same setting as during normal operation). It should be understood that, here, it is supposed that the ignition timing when starting the internal combustion engine from cold is set to a fixed value. Furthermore, the target air/fuel ratio is controlled according to the routine shown in FIG. 6. In FIG. 10E, the solid line shows the target air/fuel ratio which is implemented by the execution of the routine shown in FIG. 6, while the broken line shows the target air/fuel ratio which is implemented according to the prior art. Moreover, in FIG. 10F, the solid line shows the exhaust temperature which is implemented by the execution of the routine according to the embodiment of the present invention described above and by the routine shown in FIG. 6, while the broken line shows the exhaust temperature which is implemented with the setting of the valve timings and the target air/fuel ratio according to the prior art. Even further, in FIG. 10G, the solid line shows the discharge amount of unburned HC which is implemented by the execution of the routine according to the embodiment of the present invention described above and by the routine shown in FIG. 6, while the broken line shows the discharge amount of unburned HC which is implemented by the valve timings and the target air/fuel ratio according to the prior art.

By setting the IVO much to the retarded side of TDC after the starting of the internal combustion engine until the exhaust temperature has risen up to the temperature Tb at which it is possible to perform after-burning, as shown in FIGS. 10A through 10G, the amount of unburned HC which is discharged from the combustion chamber 10 along with the opening of the exhaust valve 14 is further decreased, as compared with the first embodiment described above. This is due to the fact that, if the IVO is set greatly to the retarded side of TDC, the pressure difference between the intake pipe pressure and the pressure within the cylinder at IVO becomes great, and the intake flow speed into the combustion chamber 10 is increased. If the intake flow speed is increased, the turbulence caused by the mixture gas flowing into the combustion chamber 10 becomes great. Due to this, the combustion in the combustion chamber 10 is improved, and, as compared with the case in which only the exhaust valve timing is controlled, it becomes possible to further reduce the amount of unburned HC which is discharged.

Thereafter, when the exhaust temperature has risen up to the temperature Tb at which it is possible for after-burning to occur, the IVO is set in the vicinity of TDC. When it has become possible for after-burning to take place within the exhaust pipe 40, the target air/fuel ratio is set to rich in order to promote elevation of the exhaust temperature due to such after-burning, but, to this extent, the amount of liquid drops of fuel which flow into the combustion chamber 10 is increased. However, by setting the IVO to the vicinity of TDC as described above, the pressure difference at IVO between the intake pipe pressure and the pressure within the cylinder becomes small, and it is possible to suppress the flowing of liquid drops of fuel into the combustion chamber 10. Due to this, it is possible to reduce the amount of unburned HC which is discharged in the form of liquid drops into the exhaust pipe 40, and it is accordingly possible to promote the after-burning of the unburned HC within the exhaust pipe 40.

Furthermore, when the exhaust temperature has become elevated as far as the temperature Tc at which the adherence of drops of liquid fuel to the exhaust valve 14 or the cylinder wall surface ceases, then the IVO is set back to greatly to the retarded side of TDC again. By doing this, the valve overlap between the exhaust valve 14 and the intake valve 12 is reduced and interior EGR is decreased, so that it is possible to stabilize the combustion in the combustion chamber 10.

As described above, according to the valve timing control of this third embodiment, by performing control of the intake valve timing as well, in addition to control of the timing of the exhaust valve, it is possible further to improve the exhaust emissions during starting of the internal combustion engine, and in particular when starting the engine from cold. Furthermore, if the intake valve timing control which is implemented by the routine shown in FIG. 8 is not combined with any exhaust valve timing control, but is only performed by itself, then a beneficial effect of improving the exhaust emissions can still be reaped. It would also be acceptable to arrange to perform only this intake valve timing control, in parallel with secondary air supply control.

Embodiment 4

Next, a fourth embodiment of the present invention will be explained with reference to FIG. 11.

Figure 11:
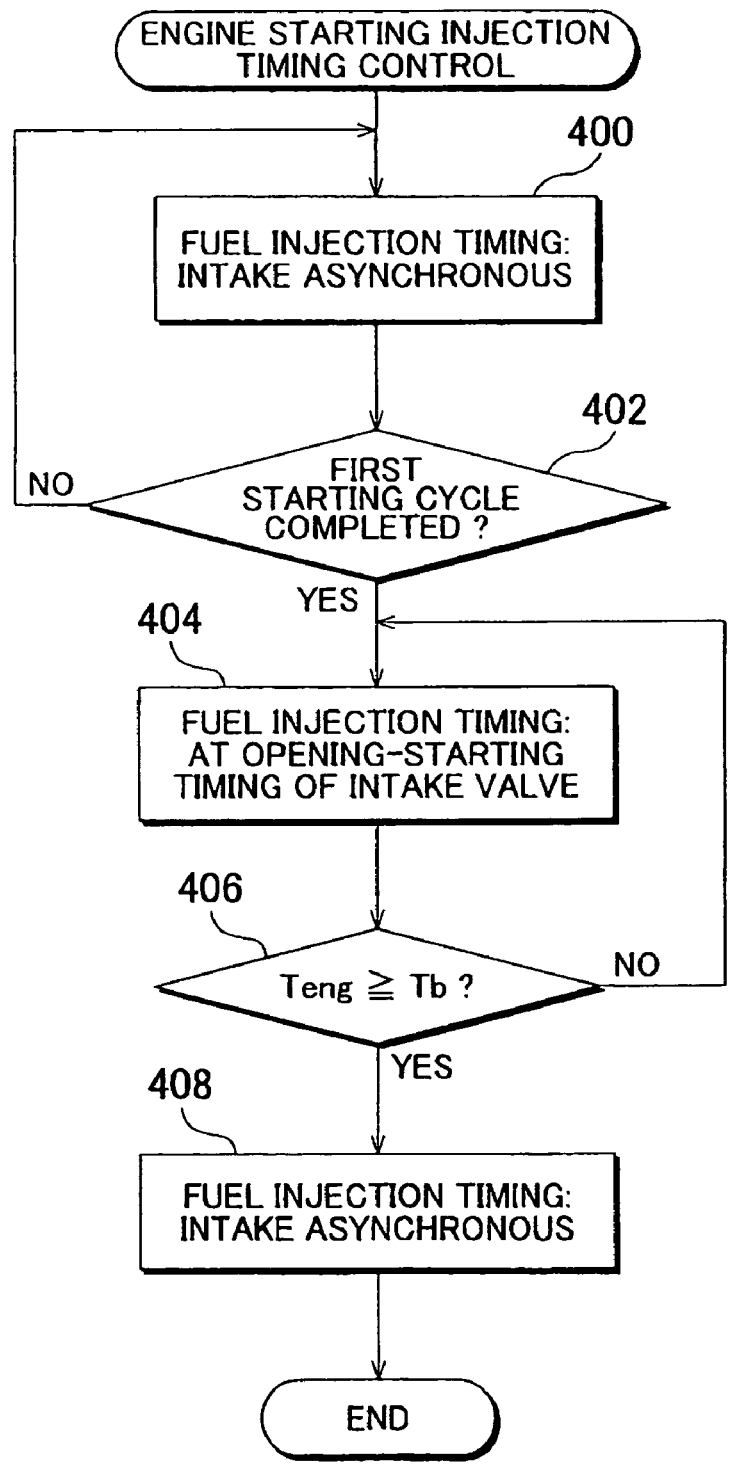
FIG. 11 is a flow chart showing an engine starting injection timing control routine which is executed in a fourth embodiment of the present invention.

The control device according to the fourth embodiment of the present invention is applied to an internal combustion engine which has the same structure as that of the engine of the first embodiment, while execution of the routine shown in FIG. 11 is implemented upon its ECU 50, in parallel with the routine (for exhaust valve timing control) shown in FIG. 2. In this routine shown in FIG. 11, control of the fuel injection timing during starting of the internal combustion engine is performed. The routine shown in FIG. 11 is executed at the same time that the start switch 58 is turned ON and cranking of the internal combustion engine is initiated. Furthermore, this routine is executed for each one of the cylinders individually.

In the initial step 400 of this routine, the fuel injection timing is set to before the opening of the intake valve 12. In other words, intake asynchronous injection is performed, in which the fuel injection timing is not synchronized with the opening period of the intake valve 12.

In the next step 402, a decision is made as to whether or not the first engine starting cycle of this cylinder has been completed. If this first engine starting cycle has been completed, in other words in the second and subsequent engine starting cycles, the fuel injection timing is set to the opening-starting timing of the intake valve 12, which is during an early stage of the opening period of the intake valve 12 (in a step 404).

In the next step 406, a decision is made as to whether or not the exhaust temperature Teng, as measured from the signal of the exhaust temperature sensor 54, has become greater than or equal to a predetermined reference temperature Tb (the exhaust temperature at which it becomes possible to perform after-burning). If the result of the decision in this step 406 is that the exhaust temperature Teng has become greater than or equal to the reference temperature Tb at which it is possible to perform after-burning, then the fuel injection timing is changed from the opening-starting timing of the intake valve 12 back to before the intake valve 12 opens again. In other words, intake asynchronous injection is performed (in a step 408).

According to the engine starting injection timing control routine described above, during the first engine starting cycle in which there is no residual combustion gas remaining within the combustion chamber 10, by injecting the fuel before the intake valve 12 opens by intake asynchronous injection, it is possible to ensure a sufficient time period for evaporation of the fuel within the intake port. On the other hand, during the second and subsequent engine starting cycles in which there is some residual combustion gas remaining within the combustion chamber 10, by performing the fuel injection at the timing at which the intake valve 12 starts to open, it is possible to promote the atomization of the fuel due to the combustion gas at high temperature which is blown back into the intake port from the combustion chamber 10.

Furthermore, after it has become possible to perform after-burning within the exhaust pipe 40 due to the elevation of the exhaust temperature, by again injecting the fuel before the opening of the intake valve 12 by intake asynchronous injection, it becomes possible to ensure an adequate time period for the evaporation of the fuel within the intake port. When it has become possible for after-burning to take place within the exhaust pipe 40, the target air/fuel ratio is set to rich in order to promote elevation of the exhaust temperature due to after-burning, but, to that extent, the amount of liquid drops of fuel which flows into the combustion chamber 10 is increased. However, by ensuring a sufficient time period for the evaporation of this fuel due to the intake asynchronous injection as described above, it is possible to suppress flowing of these liquid drops of fuel into the combustion chamber 10. By doing this, it is possible effectively to reduce even further the amount of unburned HC which is discharged into the exhaust pipe 40 in the form of liquid drops, so that it is possible to promote the after-burning of unburned HC within the exhaust pipe 40.

It should be understood that the engine starting injection timing control according to this fourth embodiment of the present invention may be combined with the valve timing control of the third embodiment. In other words, it would be acceptable to implement this fourth embodiment in parallel with the routine shown in FIG. 8. Furthermore, the engine starting injection timing control according to this fourth embodiment of the present invention may also be implemented in parallel with any combination of the routine shown in FIG. 2, the routine shown in FIG. 8, and the routine shown in FIG. 6.

Other

Although the present invention has been explained above in terms of certain embodiments thereof, the present invention should not be considered as being limited to these embodiments; various changes may be implemented to the present invention, provided that its gist is not departed from. For example although, in the embodiments described above, the exhaust temperature was measured directly, it would also be acceptable to estimate the exhaust temperature according to the cooling water temperature, or according to the period of operation from the initiation of the engine starting procedure, and to perform the valve timing control and the engine starting injection timing control based upon this value which has been estimated.

What is claimed is:

1. A control method for an internal combustion engine which comprises a catalyst provided within an exhaust passage, a secondary air supply device which supplies secondary air upstream of the catalyst, and an exhaust valve timing control device which controls the valve timing of an exhaust valve, comprising the step of, during supply of secondary air to the upstream side of the catalyst in the exhaust passage, controlling the pressure within the exhaust passage by controlling the opening timing of the exhaust valve, and when the exhaust temperature has become elevated to a temperature at which it is possible for after-burning of unburned HC in the exhaust gas to take place in the exhaust passage, setting the opening timing of the exhaust valve more to the retarded side, than its opening timing which is set before the exhaust temperature has attained the temperature at which it is possible for after-burning to take place.

2. A control method for an internal combustion engine according to claim 1, wherein the opening timing of the intake valve is set more to the retarded side before the exhaust temperature attains the temperature at which after-burning can take place, than its opening timing which is set after the exhaust temperature attains the temperature at which after-burning can take place.

3. A control method for an internal combustion engine according to claim 1, wherein the air/fuel ratio is set to lean until the intake pipe negative pressure reaches a predetermined reference negative pressure, and the air/fuel ratio is set to rich after the intake pipe negative pressure reaches the predetermined reference negative pressure.

4. A control method for an internal combustion engine according to claim 1, wherein:
   until the first cycle during engine starting has been completed, the opening timing of the exhaust valve is set more to the retarded side than its setting during the second and subsequent cycles;
   during the second and subsequent cycles, the closing timing of the exhaust valve is set more to the advance side than intake top dead center; and
   when, during the second and subsequent cycles, the exhaust temperature has become elevated to a temperature at which it is possible for unburned HC within the exhaust gas to be after-burned within the exhaust passage, the opening timing of the exhaust valve is set more to the retarded side, than its opening timing which is set before the exhaust temperature has attained the temperature at which after-burning can take place.

5. A control method for an internal combustion engine according to claim 1, wherein the opening timing of the intake valve is set to the neighborhood of top dead center for a predetermined period after the exhaust temperature has attained the temperature at which it is possible for after-burning to occur.

6. A control method for an internal combustion engine according to claim 5, wherein intake asynchronous injection, in which the fuel injection timing to the intake port is not synchronized with the opening period of the intake valve, is performed for a predetermined period after the exhaust temperature has attained the temperature at which it is possible for after-burning to occur.

7. A control method for an internal combustion engine according to claim 6, wherein intake asynchronous injection in which the fuel injection timing into the intake port is not synchronized with the opening period of the intake valve is performed until the first cycle when engine starting is completed, and, during the second and subsequent cycles, the fuel injection timing is set to an early stage of the opening period of the intake valve.

8. A control method for an internal combustion engine according to claim 1, wherein:
   until the first cycle during engine staffing has been completed, the opening timing of the exhaust valve is set more to the retarded side than its setting during the second and subsequent cycles;
   during the second and subsequent cycles, the closing timing of the exhaust valve is set more to the advance side than intake top dead center; and until the exhaust temperature has become elevated to a temperature at which it is possible for unburned HC within the exhaust gas to be after-burned within the exhaust passage, the opening timing of the intake valve is set more to the retarded side, than its opening timing which is set after the exhaust temperature has become elevated to a temperature at which it is possible for unburned HC within the exhaust gas to be after-burned within the exhaust passage.

9. A control device for an internal combustion engine according to claim 8, wherein, after the exhaust temperature has become elevated to a temperature at which the adherence of fuel which has flowed into the combustion chamber to the cylinder wall surface ceases or becomes negligible, the opening timing of the intake valve is set more to the retarded side, than its opening timing which was previously set.

\* \* \* \* \*

UNITED STATES PATENT AND TRADEMARK OFFICE
CERTIFICATE OF CORRECTION

| | | |
|---|---|---|
| PATENT NO. | : 7,716,919 B2 | Page 1 of 1 |
| APPLICATION NO. | : 11/582963 | |
| DATED | : May 18, 2010 | |
| INVENTOR(S) | : Nao Murase et al. | |

It is certified that error appears in the above-identified patent and that said Letters Patent is hereby corrected as shown below:

| Column | Line | |
|---|---|---|
| 20 | 12 | Change "engine staffing" to --engine starting--. |

Signed and Sealed this
Eleventh Day of January, 2011

David J. Kappos
*Director of the United States Patent and Trademark Office*